United States Patent

Takahashi

[15] 3,673,239
[45] June 27, 1972

[54] PROCESS FOR MANUFACTURING 3,3,5-TRIMETHYLCYCLOHEXYL MANDELATE

[72] Inventor: Hiroshi Takahashi, Arai, Japan
[73] Assignee: Daicel Ltd., Osaka, Japan
[22] Filed: Dec. 10, 1970
[21] Appl. No.: 97,048

[30] Foreign Application Priority Data

Dec. 16, 1969 Japan..................................44/101145

[52] U.S. Cl. ......................................................260/473 A
[51] Int. Cl................................................................C07c 69/76
[58] Field of Search ...........................................260/473 A

[56] References Cited

UNITED STATES PATENTS 2,707,193  4/1955  Nauta ................................260/473 A Primary Examiner—Lorraine A. Weinberger
Assistant Examiner—John F. Terapane
Attorney—Woodhams, Blanchard and Flynn

[57] ABSTRACT

A process for manufacturing 3,3,5-trimethylcyclohexyl mandelate in which mandelic acid is esterified with 3,3,5-trimethylcyclohexanol in an inert solvent in the presence of an acid catalyst, in which a metal (Zn, Sn, Mg, Ni or Pb) is added to the reaction system at the beginning of or during the reaction, or afterwards, to generate ketone-reductive hydrogen in situ in order to minimize formation of 3,3,5-trimethylcyclohexylphenylglyoxylate.

7 Claims, No Drawings

PROCESS FOR MANUFACTURING 3,3,5-TRIMETHYLCYCLOHEXYL MANDELATE

BACKGROUND OF THE INVENTION

1. Field of the Invention

This invention relates to a process for manufacturing 3,3,5-trimethylcyclohexyl mandelate (abbreviated as TMCM hereinafter) having a high purity, at a high yield, and simultaneously preventing production of by-products, by reacting 3,3,5-trimethylcyclohexanol and mandelic acid and generating hydrogen in situ by adding a metal and an acid, which latter also serves as an esterification catalyst.

2. Description of the Prior Art

The conventional process for synthesizing TMCM is performed by esterifying mandelic acid with 3,3,5-trimethylcyclohexanol in the presence of a catalytic quantity of a strong inorganic acid (such as sulfuric acid and hydrochloric acid or an organic sulfonic acid (such as benzenesulfonic acid and toluenesulfonic acid) in an inert organic solvent (such as benzene, toluene and dichloroethane) at the reflux temperature of said solvent. In such prior art processes, however, the reaction solution is colored yellow or brown. The obtained TMCM contains more than 1.5 percent, by weight, of 3,3,5-trimethylcyclohexylphenylglyoxylate (hereinafter abbreviated as TMCPG), which must be removed because it is an undesirable by-product. In order to remove it, it is well known to use a recrystallization process (as disclosed, for example, in Pharm.Weekblad 81,751 (1962)), and a rectification process (as disclosed, for example, in British Pat. No. 810 888). According to studies made by us, the recrystallization process yields refined TMCM containing less than 0.2 percent, by weight, of TMCPG at a yield of 35 percent, and the rectification process cannot produce TMCM containing less than 0.2 percent, by weight, of TMCPG.

SUMMARY OF THE INVENTION

We have found that the desired end product can be obtained efficiently, at a high purity and at a high yield, and simultaneously production of TMCPG can be prevented, by performing the reaction so as to generate ketone-reductive hydrogen in situ by the addition of a metal and an acid in the reaction system.

The materials which are used for generating ketone-reductive hydrogen in situ according to the present invention are metals, such as magnesium, zinc, tin, lead and nickel, and inorganic and organic acids such as hydrochloric acid, phosphoric acid, and p-toluenesulfonic acid. The metals may be charged in a powder or granule form into the reaction system.

The acid may be either gaseous or liquid, but it is convenient to use the acid in the form of a 1–50 percent by weight aqueous solution, preferably a 10–35 percent by weight aqueous solution. In the reaction process, 3,3,5-trimethylcyclohexanol, mandelic acid, an inert organic solvent and the above-described metal are mixed in a reactor and are heated to dissolve all the organic substances. When the temperature has risen to the boiling point of the inert organic solvent, a predetermined amount of the acid aqueous solution is added, in drops, to the reaction system over a predetermined period of time. The formed water and the water in the acid aqueous solution are removed from the reaction system by azeotropic dehydration (distillation). It is advantageous to continue to add drops of the acid aqueous solution as long as the reaction continues. The reaction is completed in about 1 hour, but the reaction system is aged further without further addition of reactants (mandelic acid and 3,3,5-trimethylcyclohexanol) for about 2 hours so as to insure completion of the reaction. It is adequate, for performing the hydrogen-generating reaction effectively, to add the metal in the amount of about 1–5 percent by weight, based on the weight of the mandelic acid. The total amount of the acid aqueous solution of the above-described range of concentration is added to the reaction system in the amount of about 10–40 percent by weight, based on the weight of the mandelic acid. A catalytic amount of the acid is added at the start of the esterification reaction and the balance of the acid is added when it is desired to generate hydrogen in the reaction system. As the inert solvent it is preferred to use a hydrocarbon solvent which is able to form an azeotropic mixture with water so as to remove the produced water after the reaction is completed. Acceptable inert solvents are benzene and toluene. The amount of the solvent used is preferably 1 to 2 times the weight of the mandelic acid. The number of mols of 3,3,5-trimethylcyclohexanol is from 1 to 3 times the number of mols of mandelic acid.

The process of the present invention is very effective when the hydrogen generating materials (metal and acid) are added during the reaction of 3,3,5-trimethylcyclohexanol with mandelic acid. The objectives of the invention can also be attained by adding the hydrogen-generating materials not only during the reaction, but also during the aging step after completing the reaction or even after the aging step is completed. In the latter cases, the operations and conditions are the same as those in which the process is carried out during the reaction, as described above. According to this process TMCPG can be readily reduced to TMCM, if TMCPG is produced more or less together with the desired end product. Thus, the desired end product can be obtained in a more pure form at a high yield.

EXAMPLE 1

142 grams of 3,3,5-trimethylcyclohexanol (1.0 mol), 76 grams of mandelic acid (0.5 mol), 126 grams of toluene (1.37 mol), 2.0 grams of zinc powder and 2 grams of 35 percent hydrochloric acid aqueous solution were charged into a reactor, and an esterification reaction was performed at 110°–130° C. for 1 hour. During the reaction period 18 grams of 35 percent hydrochloric acid aqueous solution was added in drops to the reaction system to generate hydrogen. Then, the reaction product was aged at 130° C. for about 2 hours. After cooling, the unreacted zinc powder was filtered off, and the filtrate was washed with 5 percent aqueous solution of sodium carbonate and water. Toluene and the unreacted 3,3,5-trimethylcyclohexanol was distilled off under reduced pressure to obtain crude TMCM. Rectified TMCM was obtained by a single distillation under reduced pressure. From 131 grams of crude TMCM, 117 grams of rectified TMCM having a boiling point of 170°–171°C./3mmHg were obtained. The yield was 84.5 percent based on the charged mandelic acid. The rectified TMCM had a melting point of 54.6°–55.4°C. and a TMCM purity of 99.9 percent. The TMCPG content was less than 0.1 percent by weight.

EXAMPLE 2

99 grams of crude TMCM were produced by the same process as in Example 1, except that there was used 2.0 grams of magnesium powder in the place of 2.0 grams of zinc. From the product, 81 grams of refined TMCM having a boiling point of 170°–171° C./3mmHg were obtained by a single distillation. The yield was 58.6 percent. The refined TMCM had a melting point of 54.2°–55.6° C. and a TMCM purity of 99.8 percent. The TMCPG content was less than 0.2 percent by weight.

EXAMPLE 3

The same process as described in Example 1 was employed, except that 2.0 grams of tin powder were used instead of 2.0 grams of zinc. Thus, 104 grams of crude TMCM were produced, from which 89 grams of refined TMCM having a boiling point of 170°–171° C./3mmHg were obtained by a single distillation. The yield was 64.3 percent. The product had a melting point of 54.6°–55.5° C. and the TMCM purity was 99.8 percent. The TMCPG content was less than 0.2 percent by weight.

EXAMPLE 4

Following the same process as described in Example 1, except that 2.0 grams of nickel powder were used instead of 2.0 grams of zinc, 98 grams of refined TMCM having a boiling point of 170°–171° C./3mmHg were obtained. The yield was 54 percent. The product had a melting point of 54.5°–55.3°C. and a TMCM purity of 99.8 percent. The TMCPG content was less than 0.2 percent by weight.

EXAMPLE 5

2.0 grams of lead were used instead of 2.0 grams of zinc in the same process as described in Example 1. 124 grams of crude TMCM were produced, from which 108 grams of refined TMCM having a boiling point of 170°–171° C./3mmHg were obtained. The yield was 78.2 percent. The refined TMCM had a melting point of 54.6°–55.6° C. and a TMCM purity of 99.8 percent. The TMCPG content was less than 0.2 percent by weight.

EXAMPLE 6

The process as described in Example 1 was followed except that 20 grams of 30 percent phosphoric acid aqueous solution was used instead of 20 grams of 35 percent hydrochloric acid. 124 grams of crude TMCM were produced, from which 108 grams of refined TMCM having a boiling point of 170° C./3mmHg were obtained by a single distillation. The yield was 78 percent. The refined TMCM had a melting point of 53.8°–54.9° C. and the TMCM purity was 99.9 percent. The TMCPG content was less than 0.1 percent by weight.

EXAMPLE 7

The same process as described in Example 1 was carried out, except that 20 grams of 30 percent aqueous solution of p-toluene-sulfonic acid were used instead of 20.0 grams of 35 percent hydrochloric acid, and 134 grams of crude TMCM were produced, from which 115 grams of refined TMCM having a boiling point of 170°–171° C./3mmHg were obtained. The yield was 83 percent. The refined TMCM had a melting point of 54.6°–55.8° C. and a TMCM purity of 99.9 percent. The TMCPG content was less than 0.1 percent by weight.

EXAMPLE 8

The process described in Example 6 was carried out except that 2.0 grams of nickel powder was used instead of 2.0 grams of zinc. 105 grams of crude TMCM were produced, from which 89 grams of refined TMCM having a boiling point of 170°–171° C./3mmHg were obtained by a single distillation. The yield was 64.4 percent. The product had a melting point of 54.4°–55.7° C. and a TMCM purity of 99.8 percent. The TMCPG content was less than 0.2 percent by weight.

EXAMPLE 9

120 grams of crude TMCM were produced by the same process as described in Example 7, except that 2.0 grams of magnesium powder were used instead of 2.0 grams of zinc. 108 grams of refined TMCM having a boiling point of 170°–171° C./3mmHg were obtained from the crude product by a single distillation. The yield was 78.2 percent. The product had a melting point of 54.6° C. and a TMCM purity of 99.7 percent. The TMCPG content was less than 0.1 percent by weight.

EXAMPLE 10

The process described in Example 1 was carried out, except that 20 grams of 10 percent sulfuric acid were used instead of 20 grams of 35 percent hydrochloric acid. 114 grams of crude TMCM were obtained, from which 95 grams of refined TMCM having a boiling point of 170°–171° C./3mmHg were obtained by a single distillation. The yield was 69.0 percent. The product had a melting point of 54.5°–55.3° C. and a TMCM purity of 99.8 percent. The TMCPG content was less than 0.2 percent by weight.

EXAMPLE 11

(A process in which the metal was added after the reaction was partially completed)

142 grams (1.0 mol) of 3,3,5-trimethylcyclohexanol, 76 grams of mandelic acid, 126 grams of toluene, and 3.0 grams of 30 percent p-toluenesulfonic acid aqueous solution were charged into a reactor and after sealing the reaction system with nitrogen gas, an esterification reaction was carried out at a reaction temperature of 110°–130° C. and removing the formed water by azeotropic dehydration. After 30 minutes had passed since the start of the reaction, 2.0 grams of zinc powder were added, and the reaction was allowed to continue in the presence of hydrogen generated thereby and by adding 10 grams of 30 percent p-toluenesulfonic acid aqueous solution in drops over a period of 1 hour. Then, the reaction product was aged further at 130° C. for about 2 hours, and then was cooled while simultaneously sealing the reaction system with nitrogen gas. The solids were filtered off, and the filtrate was neutralized with 5 percent sodium carbonate aqueous solution and water, followed by rinsing. Toluene and unreacted 3,3,5-trimethylcyclohexanol were distilled off under reduced pressure to obtain 138 grams of crude TMCM. 116 grams of refined TMCM having a boiling point of 170°–171° C./3mmHg were obtained by a single distillation of the crude product. The yield was 84.0 percent based on the charged mandelic acid. The product had a melting point of 54.5°–55.3 °C. and a TMCM purity of 99.8 percent. The TMCPG content was less than 0.1 percent by weight.

EXAMPLE 12

(A process in which the metal was added at the end of the reaction)

142 grams of 3,3,5-trimethylcyclohexanol, 76 grams of mandelic acid, 126 grams of toluene, and 7.0 grams of 30 percent p-toluenesulfonic acid aqueous solution were charged into a 500cc flask and, after sealing the reaction system with nitrogen gas, an esterification reaction was carried out at 110°–130° C. and removing the water by azeotropic dehydration. Dehydration required 5 hours. After dehydration, .2 grams of zinc and 3.0 grams of 30 percent p-toluenesulfonic acid aqueous solution were added and after aging at 130° C. for 1 hour, the reaction system was sealed with nitrogen gas and cooled. The product was treated in the same way as described in Example 11 to obtain 132 grams of crude TMCM. 115 grams of refined TMCM were obtained from the crude product by a single distillation. The yield was 83.2 percent based on the charged mandelic acid. The product had a melting point of 54.5°–55.3° C. and a TMCM purity of 99.8 percent. The TMCPG content was less than 0.2 percent by weight.

EXAMPLE 13

(A process in which the metal was added during the aging step)

The process was performed as described in Example 12 until dehydration was completed, and then the product was aged at 130° C. After 30 minutes aging, 2 grams of zinc and 3.0 grams of 30 percent p-toluenesulfonic acid aqueous solution were added to generate hydrogen, and the product was further aged for 1 hour. After cooling, the product was treated according to the process in Example 11 and 130 grams of crude TMCM were obtained. From the crude TMCM, 110 grams of refined TMCM were produced by a single distillation. The yield was 79 percent based on the charged mandelic acid. The product had a melting point of 54.6°–55.8°C. and a TMCM purity of 99.9 percent. The TMCPG content was less than 0.2 percent by weight.

The embodiments of the invention in which an exclusive property or privilege is claimed are defined as follows:

1. In a process for manufacturing 3,3,5-methylcyclohexylmandelate by esterifying mandelic acid with 3,3,5-trimethylcyclohexanol using an acid catalyst, in an inert hydrocarbon solvent, the improvement which comprises incorporating in the reaction system (A) from 1 percent to about 5 percent by weight, based on the weight of mandelic acid, of a metal selected from the group consisting of zinc, magnesium, tin, nickel and lead and (B) an acid selected from the group consisting of phosphoric acid, hydrochloric acid and p-toluenesulfonic acid, which generate ketone-reductive hydrogen in situ in the reaction system.

2. A process according to claim 1, in which the metal and the acid are incorporated in the reaction system at the beginning or during the reaction, or after the reaction is completed.

3. A process according to claim 1, in which the amount of solvent used is in the range of about 1 to about 2 times the weight of the mandelic acid.

4. A process according to claim 3 in which the solvent is selected from the group consisting of benzene and toluene.

5. A process according to claim 1, in which the acid is added in the form of an aqueous solution containing from about 1–50 percent by weight of acid.

6. A process according to claim 1, in which the acid is added in the form of an aqueous solution containing from about 10–35 percent by weight of acid.

7. A process according to claim 6, in which the total amount of aqueous acid solution added to the reaction system is in the range of from about 10 percent to about 40 percent by weight based on the weight of mandelic acid.

* * * * *